United States Patent Office 3,010,967
Patented Nov. 28, 1961

3,010,967
PROCESS FOR THE PREPARATION OF FURAN DERIVATIVES
Adolf Emil Siegrist, Basel, Max Duennenberger, Birsfelden, and Erwin Maeder, Muenchenstein, Switzerland, assignors to Ciba Limited, Basel, Switzerland
No Drawing. Filed Nov. 9, 1959, Ser. No. 851,517
Claims priority, application Switzerland Nov. 12, 1958
8 Claims. (Cl. 260—309.2)

The present invention relates to a process for the preparation of furan derivatives which, in the form of their free bases, correspond to the formula:

(1) 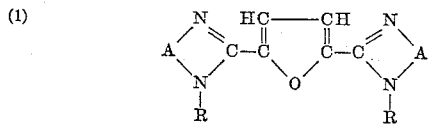

in which A represents a benzene nucleus in which two adjacent carbon atoms are attached to the two imidazole nitrogen atoms, and R represents a hydrogen atom or a substituent, for example an alkyl, hydroxyalkyl or aralkyl radical. The new process is characterized by the fact that o-diaminobenzenes of the formula:

(2) 

in which A and R have the aforesaid meanings, are reacted with dicarboxylic acids of the formula:

(3) 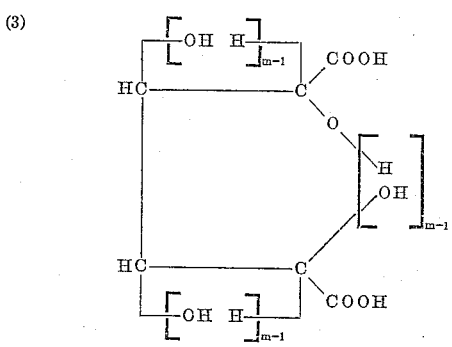

in which $m$ represents an integer not greater than 2, in a molar ratio of 2:1, at elevated temperature and in the presence of a dehydrating agent, a total of $3m+1$ molecules of water being split-off in each instance from 2 molecules of the diamine and 1 molecule of the dicarboxylic acid, and that an oxygen containing phosphoric acid is employed as the dehydrating agent for splitting-off at least the last $5-m$ molecules of water which have to be split off in the formation of 1 molecule of the compound of Formula 1.

The reaction of the present process can be formulated as follows:

(I) 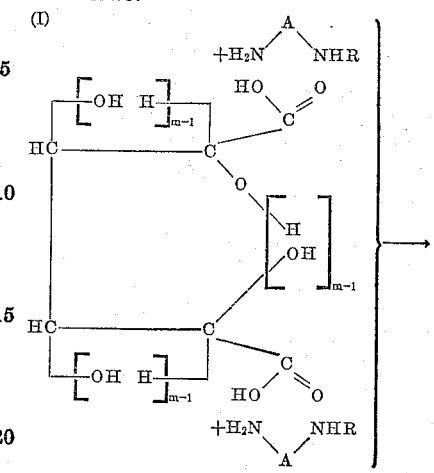

The process can accordingly be carried out by any one of the following procedures:

(A) ($m=2$.) Diaminobenzenes of Formula 2 are converted into compounds of the formula (4)

$$A\underset{\underset{R}{N}}{\overset{N}{\diagdown}}C-(CHOH)_4-C\underset{\underset{R}{N}}{\overset{N}{\diagdown}}A$$

in which A and R have the aforesaid meanings, with tetrahydroxybutanedicarboxylic acids of the formula $$HOOC-(CHOH)_4-COOH$$

at elevated temperature and with the aid of dehydrating agents. Another 3 moles of water are then split-off per mole of compound of Formula 4 at an elevated temperature, with the aid of an oxygen containing phosphoric acid. The course of the reaction can be illustrated as follows:

(II)

$$A\underset{NHR}{\overset{NH_2}{\diagdown}} + HOOC-(CHOH)_4-COOH + \underset{RHN}{\overset{H_2N}{\diagdown}}A \longrightarrow$$

$$A\underset{\underset{R}{N}}{\overset{N}{\diagdown}}C-(CHOH)_4-C\underset{\underset{R}{N}}{\overset{N}{\diagdown}}A + 4H_2O$$

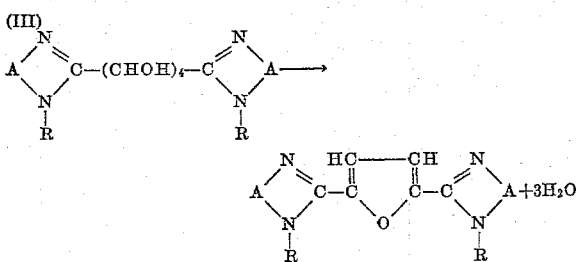

(B) ($m=2$.) Diaminobenzenes of Formula 2 are reacted at elevated temperature and with the aid of an oxygen-containing phosphoric acid with dicarboxylic acids of the formula HOOC—(CHOH)$_4$—COOH in a molar ratio of 2:1. The starting materials and the end products are in this case as in the case of the reaction referred to under (A) above, but no intermediate compound is here separated off:

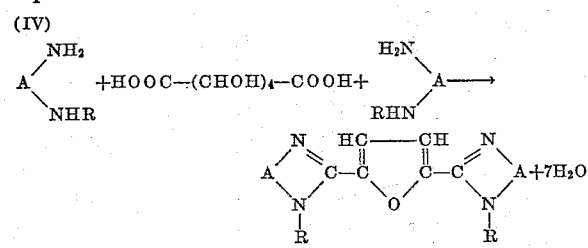

(C) ($m=1$.) Diaminobenzenes of Formula 2 are reacted at elevated temperature and with the aid of an oxygen containing phosphoric acid with furan-2,5-dicarboxylic acid in a molar ratio of 2:1.

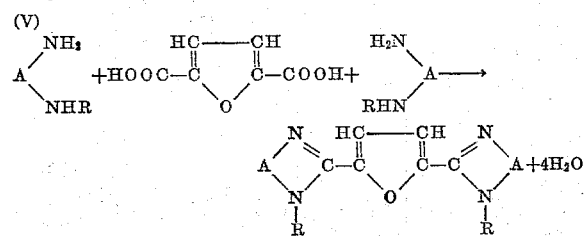

As stated at the beginning, an oxygen containing phosphoric acid must be employed as dehydrating agent for splitting off at least the last $5-m$ molecules of water which must be split off in the formation of 1 molecule of the end product of Formula 1. In the case of Reaction C ($m=1$; $5-m=4$), the dehydration consequently takes place from the outset with the aid of a phosphoric acid, while in the case of Reaction A ($m=2$; $5-m=3$) another dehydrating agent may be employed in the first reaction stage. Since no intermediate product is separated off in the case of Reaction B, the presence of a phosphoric acid as a dehydrating agent is here also necessary from the outset, as in the case of Reaction C, unless the reaction is so controlled that it takes place in two distinct stages as in Reaction A, except that the intermediate separation does not take place.

The o-diaminobenzenes serving as starting materials in the present process contain one primary and one primary or secondary amino group, for example an alkylamino, hydroxyalkylamino or aralkylamino group. They may also contain nuclear substituents, for example chlorine atoms or alkyl groups such as isopropyl, ethyl or more especially methyl groups. Preferably, o-phenylene diamine itself or an o-phenylene diamine which is further substituted in the benzene nucleus or on one amino group by a methyl group, or in the benzene nucleus by a chlorine atom are employed. As examples of o-diaminobenzenes there may be mentioned o-phenylene diamine, 1-amino-2-methylaminobenzene, 1,2-diamino-4-methylbenzene, 1,2-diamino-4-isopropylbenzene, and 1,2-diamino-4-chlorobenzene.

As dicarboxylic acids of Formula 3, in which $m$ is equal to 2 and which therefore possess the composition HOOC—(CHOH)$_4$—COOH, there may be mentioned mannosaccharic acid, idosaccharic acid and allomucic acid. Because of their good availability and reactability, saccharic acid of the formula:

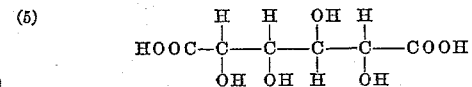

or mucic acid of the formula:

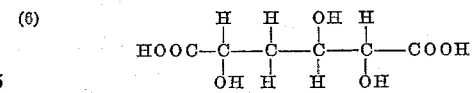

is preferably employed.

If such a tetrahydroxybutanedicarboxylic acid of formula HOOC—(CHOH)$_4$—COOH is employed as starting material and Procedure A is followed, the first stage of the reaction can be carried out in known manner, for example in accordance with the conditions given in U.S. Patent No. 2,899,440 granted August 11, 1959, to Adolf Emil Siegrist et al. The components are reacted by heating in the presence of a dehydrating agent. A suitable agent for this purpose is, for example, a dilute aqueous mineral acid, for example hydrochloric acid, sulfuric acid or phosphoric acid. Temperatures between 80° and 140° C. have proved favorable for carrying out the reaction. The reaction is advantageously so controlled that the entire dehydration necessary for the formation of the compounds of Formula 4, which can be regarded as an acylation of the amines with subsequent imidazole ring closure, takes place in one working operation. In this way the following dibenzimidacyltetrahydroxybutane compounds corresponding to the general Formula 4 can, for example, be prepared from saccharic acid or mucic acid:

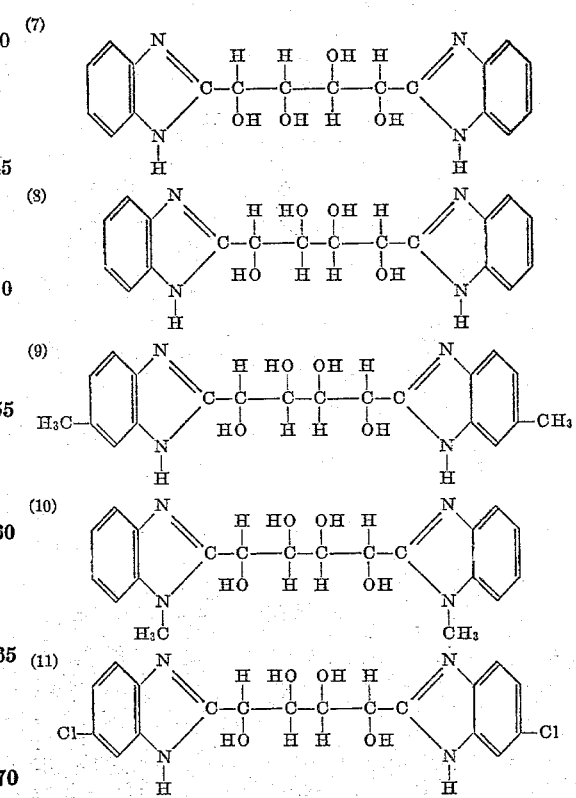

In Procedure A, 3 mols of water are split off from 1 mol of the diimidazole compound, the preparation of which has just been described and which as the free base corresponds to the above-mentioned Formula 4.

The dehydration of the aforesaid diimidazole derivatives is carried out in the presence of an oxygen containing phosphoric acid and at elevated temperature, preferably between 150° and 220° C.

The splitting-off of water advantageously takes place with the aid of phosphoric acids of the general formula:

(12)  $H_{n+2}P_nO_{3n+1}$ in which $n$ represents an integer. Consequently, polyphosphoric acids, including pyrophosphoric acid ($n=2$) or orthophosphoric acid ($n=1$), may be employed for this purpose. Pyrophosphoric acid ($n=2$) and the higher polyphosphoric acids ($n>2$) can be obtained from orthophosphoric acid and phosphorus pentoxide in appropriate weight proportions (for example, in such manner that a composition of $H_4P_2O_7$ or $H_6P_4O_{13}$ is obtained). It is immaterial whether the polyphosphoric acids are regarded as products of reaction of orthophosphoric acid and phosphorus pentoxide (VI)  $(n-1)P_2O_5 + (n+2)H_3PO_4 = 3H_{n+2}P_nO_{3n+1}$ or as dehydration products of orthophosphoric acid (VII)  $nH_3PO_4 = H_{n+2}P_nO_{3n+1} + (n-1)H_2O$ The polyphosphoric acids may also be mixtures in which $n$ represents an average value which need not be an integer and in which orthophosphoric acid ($n=1$) may be present in addition to polyphosphoric acids ($n \geq 2$).

For the dehydration, an excess of polyphosphoric acid, for example from five to ten times the weight of the compound of Formula 4 or of compounds of Formulae 7 to 11, may be employed. The dehydration takes place at elevated temperature, for example at temperatures between 150° and 200° C., preferably at about 160° C. Further additions of, for example, catalysts or diluents are unnecessary. On the other hand, it is here also desirable to operate in the absence of air, for example in a current of nitrogen or in vacuo.

The working-up is very simple, as it is merely necessary, on completion of the reaction, to dilute the mixture with water, and to add alkali metal hydroxide until an alkaline reaction is obtained, when the compounds of Formula 1 which are capable of forming water-soluble alkali salts go into solution and may be separated thereafter from insoluble by-products by filtration. The sparingly soluble hydrochlorides can be precipitated by an addition of an excess of hydrochloric acid, and the free compounds of Formula 1 may be obtained from these hydrochlorides, for example using ammonia.

The preparation of furan derivatives by the present process is particularly advantageous if the dehydrating agent employed is orthophosphoric acid, preferably concentrated aqueous orthophosphoric acid, for example one having a $H_3PO_4$ content of about 80% to 90%. The operation is preferably carried out at temperatures of from 150° to 220° C., advantageously between 180° and 210° C., the procedure comprising the gradual heating to the aforesaid temperature of a concentrated solution, for example one approximately saturated in the cold, of a base of Formula 4 in concentrated orthophosphoric acid and then maintaining it for some hours at the said temperature, the evaporated water being continuously removed. Here again, it is desirable to operate in the absence of air. The reaction may also be carried out under pressure in a sealed vessel.

As already stated, no separation of an intermediate takes place in Procedure B, and it is therefore necessary to employ a phosphoric acid, preferably orthophosphoric acid, as dehydrating agent for the entire reaction. Desirably the reaction temperature is slowly raised for example in such manner that the operation takes place first for some time between 70° and 110° C. and subsequently between 160° and 220° C. It is furthermore desirable to carry out the dehydration in dilute orthophosphoric acid at the beginning and in concentrated orthophosphoric acid at the end. It is advantageous to proceed by first effecting the reaction at 70° to 100° C. in dilute, for example approximately 30%, orthophosphoric acid, thereafter increasing the concentration of the phosphoric acid to at least 80% by distilling-off water and/or adding concentrated phosphoric acid, and terminating the reaction at a temperature between 160° and 220° C.

In the case of Procedure C, metaphosphoric acid or a phosphoric acid of Formula 12, such as orthophosphoric acid, pyrophosphoric acid or a polyphosphoric acid, or alternatively mixtures of various acids of this type may be employed in reacting the diamines of Formula 2 with furan-2,5-dicarboxylic acid. The operation is advantageously carried out at a temperature between 140° and 200° C.

If desired, further reactions may be carried out with the compounds of Formula 1 obtained by the present process, for example alkylation, hydroxyalkylation or aralkylation on the —NH-groups of the imidazole rings, quaternization or sulfonation.

Any alkylation, hydroxyalkylation or aralkylation of the furan derivatives of formula:

(13) 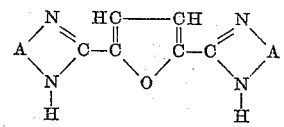

in which A has the aforesaid meaning, may also take place in the usual manner, for example by treatment with alkyl halides, such as ethyl chloride, alkylene hydrohalides, for example ethylene chlorhydrin or propylene chlorhydrin, or with aralkyl halides, such as benzyl chloride, preferably with an addition of acid-binding agents. Dialkylsulfates, such as dimethylsulfate, may also be employed for the alkylation.

For the optional sulfonation, the furan derivatives of Formula 1 are treated in the usual manner, for example with sulfuric acid monohydrate, chlorosulfonic acid or sulfuric acid containing sulfur trioxide, if desired at elevated temperature.

The quaternary ammonium salts of the furan derivatives of Formula 1, if desired, are obtained by reacting the furan compounds of Formula 1 or their salts with compounds capable of quaternizing an imidazole nitrogen atom. The usual alkylation and aralkylation agents are the most important of such compounds. There may be mentioned by way of example: methyl iodide, ethyl bromide, isopropyl chloride, secondary butyl bromide, dodecyl bromide, epichlorhydrin, dimethyl sulfate, benzyl halides and benzyl halides substituted in the nucleus, for example by halogen, alkyl or alkoxy groups, such as benzyl chloride, or p-chlorobenzyl chloride, as also menaphthyl chloride, toluene sulfonic acid esters, arylsulfonic acid alkyl esters, more especially those of the benzene series with alkyl groups of low molecular weight, such as toluene sulfonic acid ethyl or methyl esters, and compounds which contain a water-solubilizing group, such as halogenoalkyl or aralkyl sulfonic acids, for example bromoethane sulfonic acid and benzyl chloride disulfonic acid. If salts of imidazoles are used as starting materials, alkylene oxides, such as ethylene oxide, propylene oxide or glycidol may be employed for the quaternization, or finally aliphatic alcohols of low molecular weight, such as methanol or ethanol. The quaternization takes place under the conditions usual for such reactions, preferably by heating the components to relatively high temperatures, for example 50° to 200° C., if desired under pressure. The simultaneous use of inert solvents such as alcohols, for example methanol, ethyl alcohol, dioxan, monomethylglycol, benzene, toluene, nitrobenzene or mixtures of such solvents, may be advantageous. In some cases, it may be favorable to employ an excess of quaternizing agent.

The furan derivatives of the formula set out at the beginning of the specification which are obtainable by the present process have a more or less pronounced fluorescence in the dissolved or finely divided state. Depending upon their constitution, they may be employed as optical brighteners for organic materials, more especially fibrous materials and above all for polyacrylonitrile fibers, or as intermediate products in the preparation of dyes.

In the following examples, the parts and percentages are by weight and the temperatures are in degrees centigrade unless otherwise indicated.

Example 1

18 parts of the condensation product of Formula 7 are stirred for 5 hours in the absence of air at 165° to 170° with 150 parts of polyphosphoric acid. After cooling, the mixture is poured on to 500 parts of water, the brown reaction product is suction-filtered and the filtered material is dissolved in 200 parts of 3 N sodium hydroxide solution. The undissolved fractions are filtered off, and concentrated hydrochloric acid is then added to the filtrate until a strongly acid solution is obtained. The product is stirred for 1 hour at room temperature, and the condensation product of the formula:

(14) 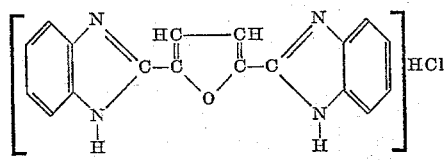

is then suction-filtered. Yield: 11 to 12 parts.

The free base is obtained by stirring the hydrochloride in 200 parts of water with an addition of 10 parts of 30% ammonia for 1 hour at 70° C. Yield: approximately 10 parts, M.P. 292° to 293.5°.

If, instead of polyphosphoric acid, the same quantity of pyrophosphoric acid is employed, the end product is obtained with approximately the same purity and in equally good yield.

The condensation product of Formula 7 employed in this example can be prepared as follows:

248 parts of the acid potassium salt of saccharic acid are introduced into 1500 parts by volume of 10% sulfuric acid with stirring and in the absence of air. 216 parts of o-phenylene diamine are thereafter introduced by distillation, and the temperature is thereafter raised in the course of 3 hours until the mixture boils gently. The solution obtained is further stirred for 18 to 24 hours in the absence of air at 105°–110°. The reaction mixture is then cooled to 10°–15° and further stirred for some hours at this temperature. The precipitated crystalline mass is filtered and the residue is washed with ice water until it is neutral to Congo red, and dried.

Yield about 438 parts, corresponding to 93.4% of the theory.

After recrystallization from 10% sulfuric acid, the sulfate of the condensation product of Formula 7 is obtained as a colorless crystalline powder which is rather readily soluble in hot water. The free base can be obtained by dissolving the sulfate in hot water and reacting with sodium carbonate. After filtration, careful washing with water and drying, the base is obtained as a white powder, which melts at 241–241.5° with decomposition.

*Analysis.*—$C_{18}H_{18}O_4N_4$.—Calculated: C, 61.01; H, 5.12; N, 15.81. Found C, 60.89; H, 5.23; N, 15.61.

Example 2

70.8 parts of the condensation product of Formula 7 are stirred with 500 parts of 85% orthophosphoric acid in the absence of air. The reaction mixture is heated to 200° in the course of two hours. During this time, the main quantity of the evaporated water distills off through a water separator. The product is thereafter stirred for a further 4 hours at 200–202° until the reaction is complete. The brown reaction solution is cooled to 140°, and 150 parts of water are added dropwise with vigorous stirring so that the temperature does not fall below 120°. Towards the end of the addition of the water, fine, pale yellow needles separate off. The mixture is cooled to 15°, filtered through a glass suction filter and the residue is washed with 300 parts of 50% aqueous alcohol. For the preparation of the free base, the moist filtered material is introduced into 1500 parts of water and the mixture is stirred for 1 to 2 hours with addition of aqueous ammonium hydroxide solution at 60–70° until the reaction remains permanently alkaline. After filtration, washing with water, and drying, there are obtained about 51.6 parts, corresponding to 81.1% of the theory, of 2,5-di-[benzimidazyl-(2)]-furan of the formula

(15) 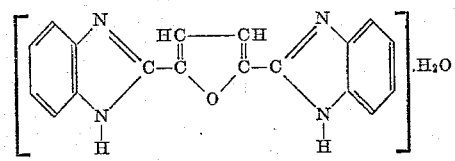

as a pale yellow powder, which melts at 293–294° and is soluble in aqueous sodium hydroxide solution with an intense violet-blue fluorescence.

After recrystallization three times from a mixture of ethanol and water (5:4), pale yellow needles having a melting point of 296–298° C. are obtained.

*Analysis.*—$C_{18}H_{14}O_2N_4$.—Calculated: C, 67.91; H, 4.43; N, 17.60. Found: C, 67.50; H, 4.46; N, 17.34.

Example 3

70.8 parts of the condensation product of Formula 8 are heated to 195° in the course of 2½ hours with 700 parts of 85% orthophosphoric acid in the absence of air. The initially rather thick reaction mass becomes readily stirrable and goes into solution, and intense violet-blue fluorescence is gradually produced. The evaporated water is distilled off through a water separator throughout the entire reaction. To complete the reaction, the product is stirred for another 5 hours at 195–200° C. The brown reaction solution is cooled to 140°, and 250 parts of water are added dropwise with vigorous stirring, care being taken that the temperature does not fall below 120°. Towards the end of the addition of water, fine pale yellow needles separate off. The product is cooled to 15°, suction-filtered through a glass suction filter and washed with 500 parts of 50% aqueous alcohol. For the preparation of the free base, the moist filtered material is added to 1500 parts of water, and stirred for 1 to 2 hours with the addition of aqueous ammonium hydroxide solution at 60–70° until the reaction mixture remains permanently alkaline. After filtration, washing with water and drying, there are obtained about 56.8 parts, corresponding to 89.3% of the theory, of 2,5-di-[benzimidazyl-(2)]-furan of Formula 15 as a pale yellow powder, which melts at 293–294° and is soluble in aqueous sodium hydroxide solution with an intense violet-blue fluorescence.

The condensation product of Formula 8 employed as starting material in this example can be prepared as follows. 210 parts of mucic acid and 216 parts of freshly distilled o-phenylene diamine in 1500 parts by volume of 15% sulfuric acid are stirred for 4 hours in the absence of air on the boiling water bath. The reaction mixture is thereafter maintained in a gently boiling condition for 18 to 24 hours with stirring in an oil bath at 110–115°. 750 parts of hot water are then added and the mixture is slowly cooled to room temperature (approximately 15°) and further stirred for 2 to 3 hours at this temperature. The crystalline mass obtained is filtered, and the filtered material is thereafter washed with cold water until neutral to Congo red and then dried. There are obtained about 474 parts of a grey-tinged, white, crystalline powder, which corresponds to a yield of 90.4%. After recrystallization from 10% sulfuric acid with the addition of activated charcoal, the sulfate of the condensation product of Formula 8 is obtained as a colorless crystalline powder which darkens from about 212° and decomposes above 249°.

For the preparation of the free base, this salt is stirred with aqueous ammonium hydroxide solution and filtered, and the filtered material is washed with water and dried. The free base is obtained as a colorless crystalline powder which melts with decomposition at 283.5–284.5°.

*Analysis.*—$C_{18}H_{18}O_4N_4$.—Calculated: C, 61.01; H, 5.12; N, 15.81. Found: C, 60.99; H, 5.12; N, 15.80.

*Example 4*

104.8 parts of the sulfate of Formula 8, containing 4 molecules of water of crystallization, are heated in one hour, with stirring, to 150° with 400 parts of pyrophosphoric acid in the absence of air. The temperature is raised to 180° in four hours, and the brown reaction solution is further stirred for 5 hours at 180–185°. The mixture is thereafter allowed to cool to 135° and 150 parts of water are added dropwise in 30 minutes with vigorous stirring. The finely precipitated reaction product is filtered through a glass suction filter and then washed with dilute aqueous orthophosphoric acid and finally with water. For the preparation of the free base, the moist filtered material is dissolved in 1250 parts of water with 350 parts by volume of 30% aqueous sodium hydroxide solution at 80–85°, and decolorized with activated charcoal; aqueous mineral acid is then added to the filtrate until it has a weakly alkaline reaction to phenolphthalein. The precipitated 2,5-di-[benzimidazyl-(2)]-furan is filtered, washed with water and dried. There are thus obtained about 42.6 parts, corresponding to 66.9% of the theory, of a pale yellow powder, which is identical with the preparations obtained in accordance with Examples 1 to 3.

If, in this example, the reaction is carried out for 5 hours at 190–197° instead of for 5 hours at 180–185°, there are obtained about 48.0 parts, corresponding to 75.5% of the theory, of 2,5-di-[benzimidazyl-(2)]-furan.

*Example 5*

19.1 parts of the condensation product of Formula 9 are reacted with 400 parts of 85% aqueous orthophosphoric acid in accordance with the conditions of Example 3. For the preparation of the free base, the moist suction-filtered material is dissolved in 1000 parts of water with 30% aqueous sodium hydroxide solution at 80–85°, decolorizing with activated charcoal, and aqueous mineral acid is then added to the filtrate until a weakly alkaline reaction to phenol-phthalein is obtained. After filtration, washing with water and drying, there are obtained about 9.9 parts, corresponding to 57.5% of the theory, of 2,5-di-[6-methylbenzimidazyl-(2)]-furan of the formula:

(16)

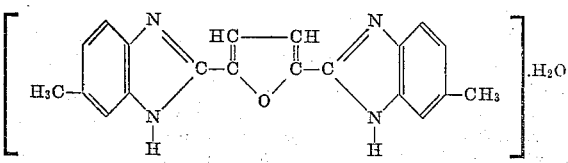

as a pale yellow powder which melts above 320°. After 3 recrystallizations from a mixture of ethanol and water (1:1), pale yellow needles having the following analytical percentage composition are obtained:

*Analysis.*—$C_{20}H_{18}O_2N_4$.—Calculated: C, 69.35; H, 5.24; N, 16.18. Found: C, 69.13; H, 5.43; N, 15.92.

The condensation product of Formula 9 employed as starting material in this example, can be prepared in accordance with the prescriptions of Example 3, paragraph 2, by reacting 525 parts of mucic acid and 61 parts of 1-methyl-3,4-diaminobenzene in 800 parts by volume of 15% sulfuric acid. The free base is obtained in the form of a colorless crystalline powder which melts with decomposition at 275.5–276°.

*Analysis.*—$C_{20}H_{22}O_4N_4$.—Calculated: C, 62.81; H, 5.80; N, 14.65. Found: C, 62.68; H, 5.92; N, 14.51.

*Example 6*

19.1 parts of the condensation product of Formula 10 are reacted with 200 parts of 85% aqueous orthophosphoric acid in accordance with the prescriptions of Example 3. 300 parts of hot water are added dropwise in 15 minutes to the reaction solution cooled to about 140°, the reaction product separating out as yellow crystals. The product is cooled to room temperature, filtered through a glass suction filter and washed with water. For the preparation of the free base, the moist filtered material is stirred with aqueous ammonium hydroxide solution at elevated temperature and filtered, and the filtered material is washed to neutrality with water and dried. There are obtained about 14.2 parts corresponding to 86.6% of theory, of 2,5-di-[N-methylbenzimidazyl-(2)]-furan of the formula:

(17)

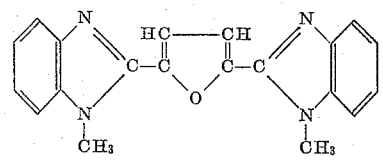

as a pale yellow powder which melts at 272–273°. After recrystallization 3 times from dioxan, pale yellow needles having a melting point of 273–274° are obtained.

*Analysis.*—$C_{20}H_{16}ON_4$.—Calculated: C, 73.15; H, 4.91; N, 17.06. Found: C, 73.03; H, 4.91; N, 16.93.

The condensation product of Formula 10, employed as starting material in this example, can be prepared in accordance with the prescriptions of Example 3, paragraph 2, by reacting 525 parts of mucic acid and 61 parts of 1-amino-2-methylaminobenzene in 500 parts by volume of 15% sulfuric acid. The free base is obtained as a colorless crystalline powder which melts with decomposition at 259–261°.

*Analysis.*—$C_{20}H_{22}O_4N_4$.—Calculated: C, 62.81; H, 5.80; N, 14.65. Found: C, 62.71; H, 5.86; N, 14.79.

*Example 7*

42.3 parts of the condensation product of Formula 11 are reacted with 600 parts of 85% aqueous orthophosphoric acid in accordance with the prescriptions of Example 3 and separated off by the addition of 750 parts of water. The free base is prepared by dissolving the product in aqueous sodium hydroxide solution at 80–85°, decolorizing the solution with activated charcoal, and precipitating the filtrate with aqueous mineral acid until a weakly alkaline reaction to phenolphthalein is obtained. After filtration, washing with water and drying, about 33.7 parts, corresponding to 87% of the theory, of 2,5-di-[6-chlorobenzimidazyl-(2)]-furan of the formula:

(18)

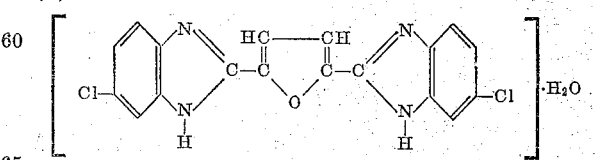

are obtained as a yellowish powder which melts above 300°. Three recrystallizations from a mixture of ethanol and water (3:1) give a finely crystalline pale yellow powder.

*Analysis.*—$C_{18}H_{12}O_2N_4Cl_2$.—Calculated: C, 55.83; H, 3.12; N, 14.47; Cl, 18.31. Found: C, 55.80; H, 3.22; N, 14.23; Cl, 18.02.

The condensation product of Formula 11, employed as starting material in this example, can be prepared in accordance with the conditions of Example 3, paragraph 2, by reacting 525 parts of mucic acid and 71.3 parts of 1-chloro-3,4-diaminobenzene in 750 parts by volume of 10% sulfuric acid. The free base is obtained as a colorless crystalline powder which melts with decomposition at 289–290°.

*Analysis.*—$C_{18}H_{16}O_4N_4Cl_2$.—Calculated: C, 51.08; H, 3.81; N, 13.24; Cl, 16.75. Found: C, 51.04; H, 3.94; N, 13.31; Cl, 16.64.

Example 8

108 parts of o-phenylene diamine, 105 parts of mucic acid and 1000 parts of 85% aqueous orthophosphoric acid are stirred for 1 hour at 69–72° and for 14 hours at 79–81° in the absence of air. 500 more parts of 85% aqueous orthophosphoric acid are added to the rather thick reaction mass and the temperature is brought to 190° in 9 hours, the evaporated water being removed with a water separator. The dark-brown reaction solution is thereafter stirred for 6 hours at 190–197° and then cooled to about 135°. 500 parts of water are then added dropwise with vigorous stirring, and the reaction product separates out as fine yellow needles. The mixture is cooled to room temperature, filtered through a glass suction filter and washed first with dilute aqueous orthophosphoric acid and then with water. For the preparation of the free base, the moist filtered material is dissolved in 2500 parts of water with 800 parts by volume of 30% aqueous sodium hydroxide solution at 80–85° and decolorizing with activated charcoal, and aqueous mineral acid is added to the filtrate until a weakly alkaline reaction to phenolphthalein is obtained. The separated 2,5-di-[benzimidazyl-(2)]-furan of Formula 15 is filtered, washed with water and dried. About 118 parts, corresponding to 74.2% of theory, of a pale yellow powder melting at 292–294° are obtained.

After recrystallization three times from a mixture of ethanol and water (4:3), pale yellow needles having a melting point of 294–296° are obtained.

*Analysis.*—$C_{18}H_{14}O_2N_4$.—Calculated: C, 67.91; H, 4.43; N, 17.60. Found: C, 67.81; H, 4.71; N, 17.35.

If, in this example, 124 parts of the acid potassium salt of saccharic acid are employed instead of 105 parts of mucic acid, there are obtained about 68.1 parts, corresponding to 42.8% of the theory, of 2,5-di-[benzimidazyl-(2)]-furan.

Example 9

54 parts of o-phenylene diamine are distilled into 900 parts of 28.5% aqueous orthophosphoric acid in the absence of air. 52.5 parts of mucic acid are then added and the mixture is stirred for 22 hours at 90°. 500 parts of water are distilled off from the light grey, rather thick reaction mass in the course of 6½ hours, and at the same time 700 parts of 85% aqueous orthophosphoric acid are added in a number of portions. The temperature is thereafter brought to 190° in 2½ hours, during which time further water is distilled off through a water separator. The rather dark reaction solution, which now has an intense violet-blue fluorescence, is further stirred for 6 hours at 190–197° and thereafter cooled to about 135°. 500 parts of water are then added dropwise with vigorous stirring, and the reaction product separates out as yellow needles. The mixture is cooled to room temperature, suction-filtered through a glass suction filter and washed first with dilute aqueous orthophosphoric acid and then with water. For the preparation of the free base, the moist filtered material is dissolved in aqueous sodium hydroxide solution at 80–85° and decolorized with activated charcoal, and aqueous mineral acid is added to the filtrate until it has a weakly alkaline reaction to phenolphthalein. The precipitated 2,5-di-[benzimidazyl-(2)]-furan of Formula 15 is filtered, washed with water and dried. There are obtained about 59.9 parts, corresponding to 75.2% of the theory, of a pale yellow powder melting at 303–305°.

Example 10

108 parts of o-phenylene diamine, 124 parts of the acid potassium salt of saccharic acid and 750 parts of 28.5% aqueous orthophosphoric acid are stirred for 15 hours at 90° in the absence of air. 500 parts of water are distilled off over a period of 5 hours from the pale green reaction solution, and at the same time 750 parts of 85% aqueous orthophosphoric acid are added in a number of portions. The temperature is thereafter brought to 190° within 2½ to 3 hours, during which time further water is distilled off through a water separator. The product is stirred for a further 6 hours at 190–197° and the dark-brown reaction solution is cooled to 135°. 400 parts of water are then added dropwise with vigorous stirring and the reaction product separates out as yellow needles. The product is cooled to room temperature, filtered through a glass suction filter and washed first with a little dilute aqueous orthophosphoric acid and then with water. For the preparation of the free base, the moist filtered material is dissolved in aqueous sodium hydroxide solution at 80–85° and decolorized with activated charcoal, and aqueous mineral acid is added to the filtrate until it has a weakly alkaline reaction to phenolphthalein. The 2,5-di-[benzimidazyl-(2)]-furan of Formula 15 which separates off is filtered, washed with water, and dried. There are obtained about 101.4 parts, corresponding to 63.8% of theory, of a pale yellow powder, melting at 302–304°.

Example 11

48.8 parts of 1-methyl-3,4-diaminobenzene, 49.6 parts of the acid potassium salt of saccharic acid and 750 parts of 28.5% aqueous orthophosphoric acid are reacted in accordance with the prescriptions of Example 10. There are obtained about 36.7 parts, corresponding to 53.2% of the theory, of 2,5-di-[6-methylbenzimidazyl-(2)]-furan of Formula 16 in the form of a pale yellow powder melting above 320°. After three recrystallizations from a mixture of ethanol and water (1:1), fine pale yellow needles having the following analytical values are obtained:

*Analysis.*—$C_{20}H_{18}O_2N_4$.—Calculated: C, 69.35; H, 5.24; N, 16.18. Found: C, 69.26; H, 5.47; N, 16.33.

If, in the foregoing example, 42.0 parts of mucic acid are employed instead of 49.6 parts of the acid potassium salt of saccharic acid, and if the reaction is carried out with 1500 parts of 28.5% aqueous orthophosphoric acid, there are obtained about 39.4 parts, corresponding to 56.9% of the theory, of 2,5-di-[6-methylbenzimidazyl-(2)]-furan.

Example 12

24.4 parts of 1-amino-2-methylaminobenzene, 24.8 parts of the acid potassium salt of saccharic acid and 375 parts of 28.5% aqueous orthophosphoric acid are reacted in accordance with the prescriptions of Example 10, only 375 parts of 85% aqueous orthophosphoric acid being employed instead of 750 parts. 750 parts of hot water are added dropwise to the reaction solution cooled to 120°. The product is slowly cooled to about 15° and the reaction product crystallizes as yellow platelets. After suction-filtering and washing with water, the moist filtered material is stirred with aqueous ammonium hydroxide solution at elevated temperature for the preparation of the free base. The product is thereafter cooled to room temperature, filtered, washed with water, and dried. There are obtained about 19.4 parts, corresponding to 59.2% of the theory, of 2,5-di-[N-methyl-benzimidazyl-(2)]-furan of Formula 17 as a pale yellow powder melting at 271–273°. After three recrystallizations from dioxan, the pale yellow needles having a melting point of 273–274° are obtained.

*Analysis.*—$C_{20}H_{16}ON_4$.—Calculated: C, 73.15; H, 4.91; N, 17.06. Found: C, 72.92; H, 4.85; N, 16.90.

Example 13

28.5 parts of 1-chloro-3,4-diaminobenzene, 21.0 parts of mucic acid and 750 parts of 28.5% aqueous orthophosphoric acid are reacted in accordance with the particulars of Example 10, 1000 parts of pyrophosphoric acid being added instead of 750 parts of 85% orthophosphoric acid. There are obtained about 24.8 parts, corresponding to 64.1% of the theory, of 2,5-di-[6-chlorobenzimidazyl-(2)]-furan of Formula 18 as a yellowish powder melting above 300°. Three recrystallizations from a mixture of ethanol and water (3:1) give a pale yellow finely crystalline powder having the following analytical values:

Analysis.—$C_{18}H_{12}O_2N_4Cl_2$.—Calculated: N, 14.47; Cl, 18.31. Found: N, 14.19; Cl, 18.27.

Example 14

108 parts of freshly distilled o-phenylene diamine, 78 parts of furan-2,5-dicarboxylic acid and 600 part of pyrophosphoric acid are stirred in the absence of air. The temperature is raised to 150° in 5 hours and the now slightly green-tinged, rather thick reaction mixture is stirred for 15 hours at 150–152° and for 2 hours at 160–165°, whereby a yellowish-green, rather thin liquid mass is formed. The mass is then cooled to 140° and 500 parts of water are added dropwise with vigorous stirring, the reaction product separating out as yellow needles. After cooling to room temperature, the product is filtered through a glass suction filter and washed with dilute, aqueous orthophosphoric acid and then with water. For the preparation of the free base, the moist filtered material is dissolved in 2500 parts of water with 800 parts by volume of 30% aqueous sodium hydroxide solution at 80–85°, and decolorized with 5 parts of activated charcoal, and aqueous mineral acid is added to the filtrate until it has a weakly alkaline reaction to phenolphthalein. The separated 2,5-di-[benzimidazyl-(2)]-furan of Formula 15 is filtered, washed to neutrality with water and dried. There are obtained about 129.0 parts, corresponding to 81.1% of the theory, of a pale yellow powder which melts at 300–305°.

After three recrystallizations from a mixture of ethanol and water (5:4), pale yellow needles having a melting point of 305–306° are obtained.

Analysis.—$C_{18}H_{14}O_2N_4$.—Calculated: C, 67.91; H, 4.43; N, 17.60. Found: C, 67.71; H, 4.62; N, 17.79.

If the above-described reaction is carried out for 48 hours at 130–135°, there are obtained about 67.8 parts, corresponding to 42.7% of the theory, of 2,5-di-[benzimidazyl-(2)]-furan.

If, in the foregoing example, 500 parts of metaphosphoric acid are employed instead of 600 parts of pyrophosphoric acid, and if the reaction is carried out for 4 hours at 170–190°, there are obtained about 138.2 parts, corresponding to 87° of the theory, of 2,5-di-[benzimidazyl-(2)]-furan.

Example 15

108 parts of o-phenylene diamine are distilled in 350 parts of pyrophosphoric acid in the absence of air. 78 parts of furan-2,5-dicarboxylic acid are then added with stirring in 15 minutes without cooling. The rather thick reaction mass is heated to 170° in 1½ hours when a thin liquid green suspension is formed. The mass is further stirred for 6 hours at 170–172°, the green reaction solution is cooled to about 150° and it is added to 1000 parts of hot water with good stirring. The yellowish-green suspension obtained is stirred in the cold, suction-filtered and washed with cold water until neutral to Congo red. For the preparation of the free base, the moist filtered material is stirred at elevated temperature with aqueous ammonium hydroxide solution. After cooling, filtration, washing with water and drying, there are obtained about 149.2 parts, corresponding to 93.8% of the theory, of 2,5-di-[benzimidazyl-(2)]-furan of Formula 15 as a pale yellow powder melting at 304–305°.

If, in this example, 500 parts of polyphosphoric acid containing 83% of $P_2O_5$ are employed instead of 350 parts of pyrophosphoric acid, and if the o-phenylene diamine is added in solid form, there are obtained about 133.8 parts, corresponding to 87.3% of the theory, of 2,5-di-[benzimidazyl-(2)]-furan.

Example 16

108 parts of freshly distilled o-phenylene diamine, 78 parts of furan-2,5-dicarboxylic acid and 1000 parts of 85% aqueous orthophosphoric acid are heated to 130° in 3 hours in the absence of air. The temperature is gradually raised to 180° in 20 hours and further stirred for 4 hours at 180–185°, the evaporated water being removed through a water separator. The yellowish-green reaction solution is cooled to about 140°, 350 parts of hot water are added dropwise in 30 minutes with vigorous stirring, and the reaction product separates out as fine yellow needles. The mixture is then cooled to room temperature, the product is suction-filtered and washed with cold water. For the preparation of the free base, the procedure indicated in Example 14 is followed, and about 128.5 parts, corresponding to 80.5% of the theory, of 2,5-di-[benzimidazyl-(2)]-furan of Formula 15 are obtained as a pale yellow powder melting at 300–305°.

If, in this example, the reaction is carried out at 165–170°, about 121.4 parts, corresponding to 76.1% of the theory, of 2,5-di-[benzimidazyl-(2)]-furan are obtained.

Example 17

48.8 parts of 1-methyl-3,4-diaminobenzene, 31.2 parts of furan-2,5-dicarboxylic acid and 500 parts of 85% aqueous orthophosphoric acid are gradually heated to 150° in 10 hours in the absence of air, and stirred for a further 18 hours at 150–152°. The yellowish-brown reaction solution is then worked up to give the free base using the conditions of Example 14. There are obtained about 41.7 parts, corresponding to 60.3% of the theory, of 2,5-di-[6-methyl-benzimidazyl-(2)]-furan of Formula 16 as a pale yellow powder melting above 320°. After three recrystallizations from a mixture of ethanol and water (4:3), pale yellow needles having the following analytical values are obtained:

Analysis.—$C_{20}H_{18}O_2N_4$.—Calculated: C, 69.35; H, 5.24; N, 16.18. Found: C, 69.45; H, 5.51; N, 16.33.

If, instead of the 500 parts of orthophosphoric acid, 400 parts of pyrophosphoric acid are used, there are obtained about 39.5 parts, corresponding to 57.2% of the theory of 2,5-di-[6-methyl-benzimidazyl-(2)]-furan.

Example 18

24.4 parts of 1-amino-2-methylamino-benzene, 15.6 parts of furan-2,5-dicarboxylic acid and 300 parts of pyrophosphoric acid are reacted for 12 hours at 160–165° in the absence of air, thereafter cooled to 120° and then diluted with 500 parts of hot water. After cooling to room temperature, suction-filtering and washing with cold water, the crystalline filtered material is converted into the free base with aqueous ammonium hydroxide solution at elevated temperature. There are obtained about 14.45 parts, corresponding to 41.7% of theory, of 2,5-di-[N-methylbenzimidazyl-(2)]-furan of Formula 17 as a pale yellow powder melting at 270–272°. After three recrystallizations from dioxan, pale yellow needles having a melting point of 273–274° are obtained.

Analysis.—$C_{20}H_{16}ON_4$.—Calculated: C, 73.15; H, 4.91; N, 17.06. Found: C, 72.97; H, 5.13; N, 17.07.

Example 19

28.5 parts of 1-chloro-3,4-diaminobenzene, 15.6 parts of furan-2,5-dicarboxylic acid and 200 parts of pyrophosphoric acid are reacted for 20 hours at 150–155° and further reacted for 6 hours at 165–170° in the absence of air. The product is cooled to about 125° and 400 parts of hot water are added dropwise with good stirring. After cooling to room temperature, suction-filtering and washing with water, the filtered material is converted into the free base in accordance with the particulars of Example 14. There are obtained about 16.5 parts, corresponding to 42.7% of the theory, of 2,5-di-[6-chloro-benzimidazyl-(2)]-furan of Formula 18 as a yellowish powder melting above 300°. Three recrystallizations from a mixture of ethanol and water (3:1) give a pale yellow fine crystalline powder having the following analytical values:

Analysis.—$C_{18}H_{12}O_2N_4Cl_2$.—Calculated: N, 14.47; Cl, 18.31. Found: N, 14.04; Cl, 18.14.

*Example 20*

63.6 parts of 2,5-di-[benzimidazyl-(2)]-furan are dissolved in 400 parts by volume of 85% ethanol with 28 parts of sodium hydroxide at 60°. 75.6 parts of dimethyl sulfate are added dropwise with stirring in the course of 2 hours at 60–65°, and the methylation product precipitates in crystalline form. On completion of the reaction, the temperature is raised to boiling point in the course of one hour and the product is further stirred for 1 hour at this temperature with reflux cooling. The main quantity of ethanol is then distilled off, 350 parts of water being simultaneously added drop-by-drop. The reaction product, cooled to room temperature, is suction-filtered, washed to neutrality with water and dried. There are obtained about 64.2 parts, corresponding to 97.8 parts of the theory, of 2,5-di-[N-methylbenzimidazyl-(2)]-furan of Formula 17 as fine yellow needles melting at 268–270°. After three recrystallizations from dioxan, pale yellow needles having a melting point of 273–274° are obtained. The compound is identical with that obtained in accordance with Examples 6, 12 and 18.

If, instead of 63.6 parts of 2,5-di-[benzimidazyl-(2)]-furan, 69.2 parts of 2,5-di-[6-methyl-benzimidazyl-(2)]-furan are employed, there are obtained 71.3 parts corresponding to 100% of the theory, of 2,5-di-[6-methyl-N-methylbenzimidazyl-(2)]-furan of the formula:

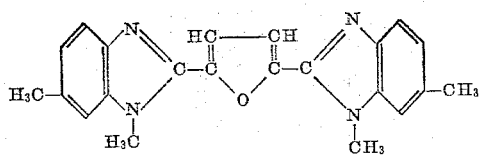

as a yellowish powder melting at 222–223°. After three recrystallizations from a mixture of ethanol and water (3:1), pale yellow matted needles having a melting point of 232–233° are obtained.

Analysis.—$C_{22}H_{20}ON_4$.—Calculated: C, 74.03; H, 5.66; N, 15.72. Found: C, 74.18; H, 5.67; N, 15.88.

*Example 21*

17.3 parts of 2,5-di-[N-methylbenzimidazyl-(2)]-furan are stirred in 25 parts by volume of ethylene glycol with 25.2 parts of dimethyl sulfate for 15 to 18 hours at 115°. The product is cooled to about 60°, 50 parts by volume of methanol are added and the mixture is cooled to 5–10°, further stirred for some time at this temperature and filtered. After washing with methanol and drying, about 26.6 parts of slightly yellowish imidazolium compound easily soluble in hot water are obtained. This compound is suitable for optically brightening protein, polyamide and acetylcellulose fibers in neutral to weakly alkaline baths.

Products having similar properties are obtained if, instead of 25.2 parts of dimethyl sulfate, and equimolecular quantity of diethylsulfate, p-chlorobenzyl chloride or p-toluenesulfonic acid ethyl ester is employed, the reaction temperature being 135–145° in the case of the latter substances.

What is claimed is:

1. Process for the manufacture of furan derivatives which correspond to the formula

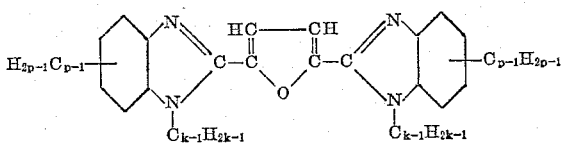

wherein $k$ and $p$ represent a whole number of at the most 2, which process comprises reacting at an elevated temperature with an oxygen containing phosphorus acid a compound of the formula

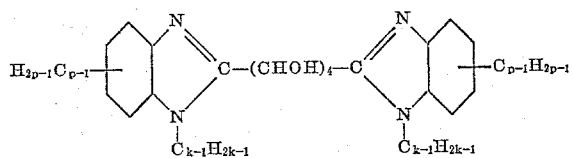

wherein each of $k$ and $p$ represents a whole number of at the most 2.

2. Process for the manufacture of furan derivatives which correspond to the formula

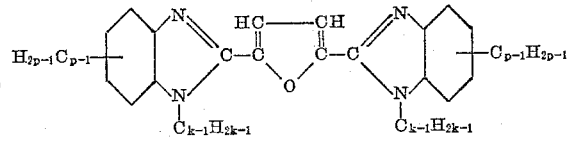

wherein each of $k$ and $p$ represents a whole number of at the most 2, which process comprises reacting at an elevated temperature with a phosphoric acid of the formula $H_{n+2}P_nO_{3n+1}$ in which $n$ is an integer a compound of the formula

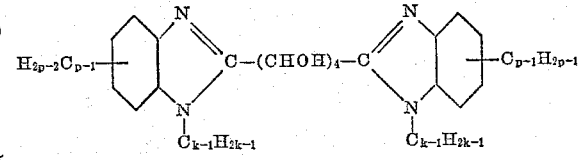

wherein each of $k$ and $p$ represents a whole number of at the most 2.

3. Process for the manufacture of furan derivatives which correspond to the formula

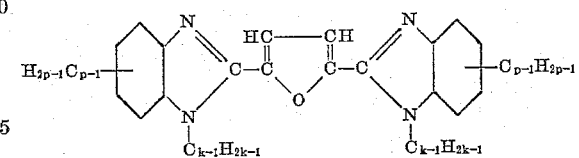

wherein each of $k$ and $p$ represents a whole number of at the most 2, which process comprises reacting at an elevated temperature ranging from 150 to 220° C. with a phosphoric acid of the formula $H_{n+2}P_nO_{3n+1}$ in which $n$ is an integer of at most 2, a compound of the formula

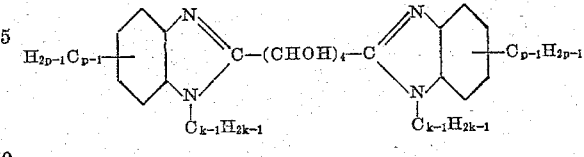

wherein each of $k$ and $p$ represents a whole number of at the most 2.

4. Process for the manufacture of 2,5-di-[benzimidazyl-(2)]-furan which comprises reacting at an elevated temperature ranging from 150 to 220° C. with a phosphoric acid of the formula $H_{n+2}P_nO_{3n+1}$ in which $n$ is an integer of at the most 2 a compound of the formula

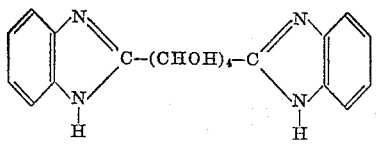

5. Process for the manufacture of furan derivatives which correspond to the formula

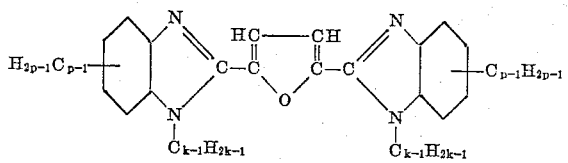

wherein each of $k$ and $p$ represents a whole number of at the most 2, which process comprises reacting at an elevated temperature and in the presence of an oxygen containing phosphoric acid in a molecular ratio of 2:1 an ortho-diamine of the formula

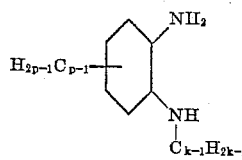

in which $k$ and $p$ have the aforesaid meaning, with a dicarboxylic acid of the formula HOOC—(CHOH)$_4$—COOH.

6. Process for the manufacture of furan derivatives which correspond to the formula

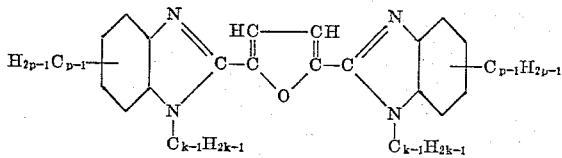

wherein each of $k$ and $p$ represents a whole number of at the most 2, which process comprises reacting at an elevated temperature and in the presence of an oxygen containing phosphoric acid of the formula $H_{n+2}P_nO_{3n+1}$ in which $n$ is an integer of at the most 2, and in a molecular ratio of 2:1 an ortho-diamine of the formula

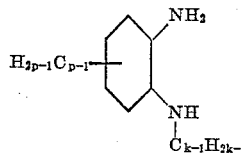

in which A and $k$ have the aforesaid meaning, with a dicarboxylic acid of the formula HOOC—(CHOH)$_4$—COOH.

7. Process for the manufacture of furan derivatives which correspond to the formula

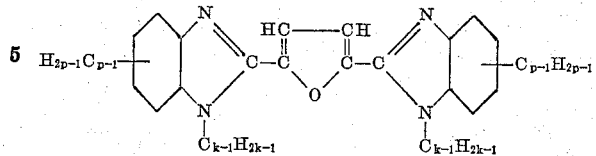

wherein each of $k$ and $p$ represents a whole number of at the most 2, which process comprises reacting at a temperature ranging from 70 to 110° C. and in the presence of dilute orthophosphoric acid in a molecular ratio of 2:1 an ortho-diamine of the formula

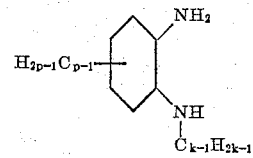

in which $k$ and $p$ have the aforesaid meanings, with a dicarboxylic acid of the formula HOOC—(CHOH)$_4$—COOH, and, without, isolating the so-obtained compound of the formula

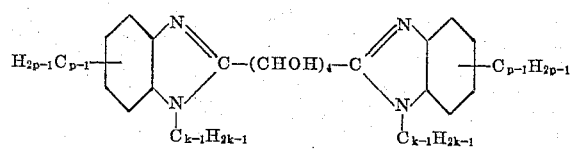

in which $k$ and $p$ have the aforesaid meanings, reacting it with concentrated orthophosphoric acid at a temperature ranging from 160 to 220° C.

8. Process for the manufacture of 2,5-di-[benzimidazyl-(2)]-furan which comprises reacting at a temperature ranging from 70 to 110° C. and in the presence of dilute ortho-phosphoric acid in a molecular ratio of 2:1 ortho-phenylene diamine with a dicarboxylic acid of the formula HOOC—(CHOH)$_4$—COOH, and, without, isolating the so-obtained 1,4-di-[benzimidazyl-(2)]-tetrahydroxybutane, reacting it with concentrated orthophosphoric acid at a temperature ranging from 160 to 220° C.

References Cited in the file of this patent
UNITED STATES PATENTS

| 2,899,440 | Siegrist et al. | Aug. 11, 1959 |
| 2,901,480 | Siegrist et al. | Aug. 25, 1959 |

OTHER REFERENCES

Lohmar: J. Biol. Chem., vol. 143, pages 551–554 (1942).

Dunlop et al.: "The Furans" (ACS Monograph No. 119), pages 35–36 (1953).

Uhlig: Angew. Chem., vol. 66, pages 435–436 (1954).

Hein et al.: J. Am. Chem. Soc., vol. 79, pages 427–9 (1957).

UNITED STATES PATENT OFFICE
CERTIFICATE OF CORRECTION

Patent No. 3,010,967                        November 28, 1961

Adolf Emil Siegrist et al.

It is hereby certified that error appears in the above numbered patent requiring correction and that the said Letters Patent should read as corrected below.

Column 13, line 16, for "part" read -- parts --; column 15, line 70, for "and" read -- an --; column 17, line 56, for "A and k" read -- k and p --; column 18, lines 24 and 41, for "without,", each occurrence, read -- without --.

Signed and sealed this 4th day of September 1962.

(SEAL)
Attest:

ERNEST W. SWIDER
Attesting Officer

DAVID L. LADD
Commissioner of Patents